United States Patent [19]
Price et al.

[11] Patent Number: 5,887,768
[45] Date of Patent: Mar. 30, 1999

[54] APPARATUS FOR DISPENSING LIQUID WITH LIQUID RETENTION

[76] Inventors: Jeffrey L. Price, 306 Timberwood Ct.; Richard Q. Poynter, 711 Pinehurst Way, both of Palm Beach Gardens, Fla. 33418

[21] Appl. No.: 78,990

[22] Filed: Apr. 27, 1998

[51] Int. Cl.⁶ ..................................................... B05B 1/28
[52] U.S. Cl. ........................... 222/571; 222/486; 222/504; 239/104
[58] Field of Search ................................ 222/486, 504, 222/571, 559; 239/104

[56] References Cited

U.S. PATENT DOCUMENTS

| | | | |
|---|---|---|---|
| 2,619,116 | 11/1952 | Ralston | 222/571 X |
| 3,240,390 | 3/1966 | Mitchell et al. | 222/504 |
| 4,004,717 | 1/1977 | Wanke | 222/571 X |
| 4,974,754 | 12/1990 | Wirz | 222/504 X |
| 5,171,367 | 12/1992 | Fitch, Jr. | 222/486 X |
| 5,467,899 | 11/1995 | Miller | 222/504 X |

*Primary Examiner*—Kevin P. Shaver
*Attorney, Agent, or Firm*—R. Gale Rhodes, Jr.

[57] ABSTRACT

Apparatus for dispensing liquid through a plurality of tubes. A valve is provided to interrupt flow of the liquid to the plurality of tubes which tubes thereafter retain any undispensed liquid contained therein due to capillarity caused by surface tension between any retained liquid and the internal walls of the plurality of tubes.

23 Claims, 4 Drawing Sheets

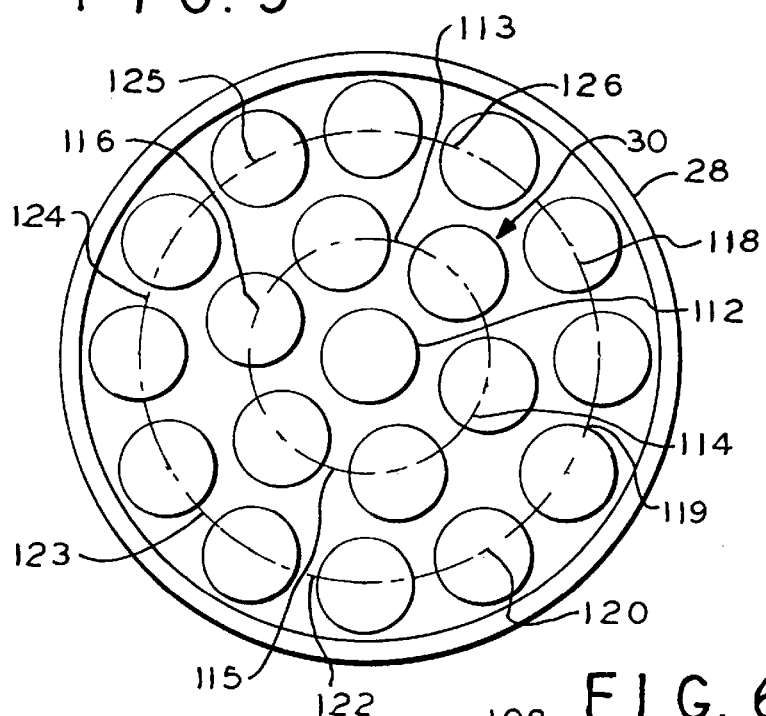
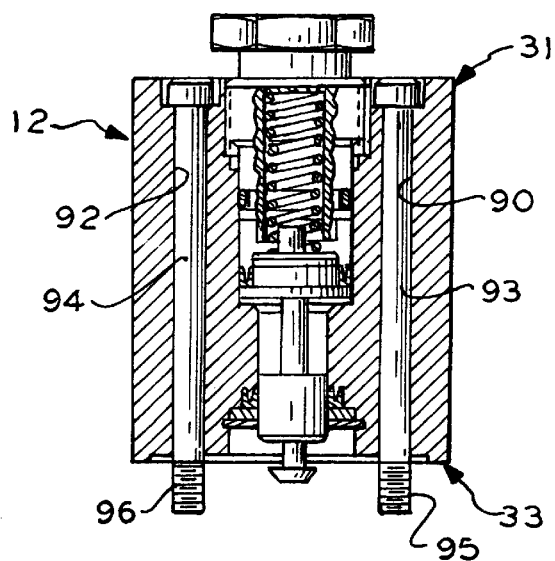
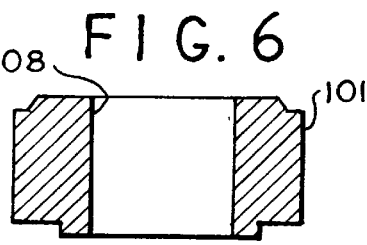
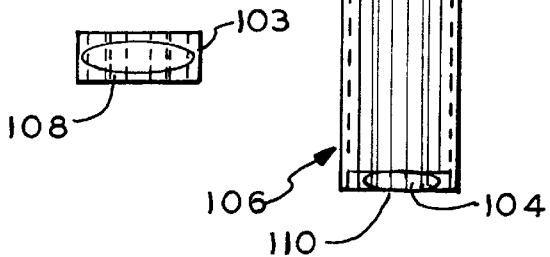
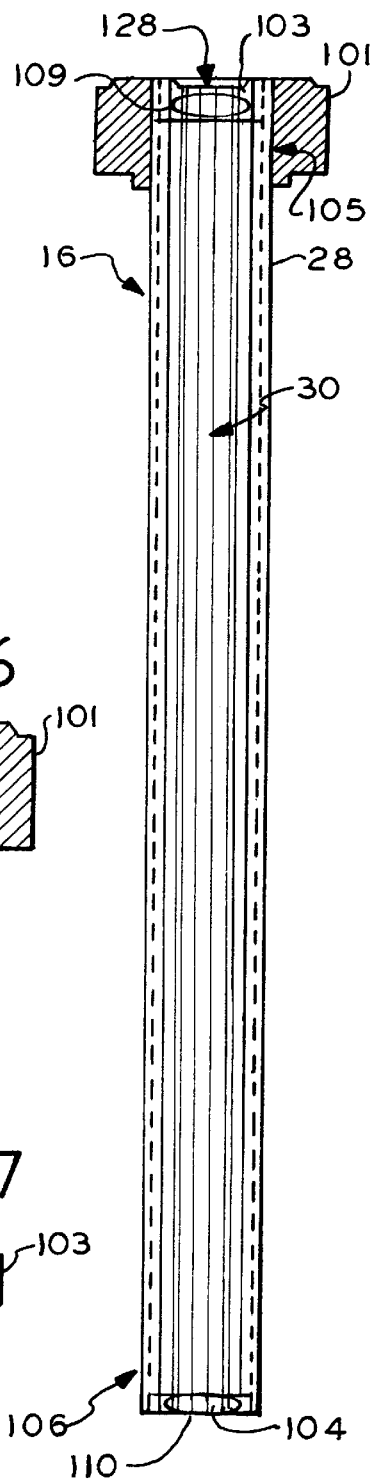

APPARATUS FOR DISPENSING LIQUID WITH LIQUID RETENTION

BACKGROUND OF THE INVENTION

This invention relates generally to apparatus for dispensing liquid and more particularly relates to apparatus for dispensing pressurized liquid with improved liquid retention for preventing unwanted liquid dispensing.

Numerous apparatus for dispensing liquid are known to the prior art. For example, and not by way of limitation, the typical blow-fill-seal machine known to the prior art includes apparatus for dispensing liquid into a partially formed plastic container, produced by blow molding, after which the container is sealed to provide what is typically referred to in the art as a pre-filled container. Such apparatus for dispensing liquid typically includes a single, hollow, elongated, cylindrical tube through which the liquid is dispensed into the partially formed plastic container; the single, hollow, elongated, cylindrical tube is typically referred to in the art as a fill needle. Upon cessation of such liquid dispensing, typically produced by valve action, liquid is retained in the fill needle by capillarity caused by surface tension between the retained liquid and the internal wall of the fill needle. Since the blow-fill-seal machine includes moving parts, vibration can be experienced which is sufficient to disrupt or overcome the surface tension between the retained liquid and the internal wall of the fill-needle causing highly undesirable over filling of the container and/or mess or liquid spillage which can be sufficient to require operation of the blow-fill-seal machine to be stopped for cleaning. Continuous operation of the blow-fill-seal machine is highly desirable for increased productivity with attendant production cost decrease while such machine stoppage is highly undesirable due to reduced productivity with attendant increase of production cost.

Accordingly, there is a need in the art for apparatus for dispensing liquid with improved liquid retention which, by way of example and not by way of limitation, is particularly useful with the above-noted blow-fill-seal machines.

SUMMARY OF THE INVENTION

It is the object of the present invention to satisfy the foregoing need in the art.

Apparatus for dispensing liquid satisfying such need and embodying the present invention receives and dispenses liquid through a plurality of tubes. A valve is provided to interrupt flow of the liquid to the plurality of tubes which tubes thereafter retain any undispensed liquid contained therein due to capillarity caused by surface tension between any retained liquid and the internal walls of the plurality of tubes.

DESCRIPTION OF THE DRAWINGS

FIG. 4 is a vertical diagrammatical view, partially in crosssection, of the fill needle of the liquid dispensing apparatus of the present invention;

FIG. 5 is an enlarged top view of the external and plurality of internal tubes comprising the fill needle of the present invention;

FIG. 6 is a vertical cross-sectional view of a bushing comprising the fill needle of the present invention;

FIG. 7 is a diagrammatical vertical elevational view of a representative sleeve comprising the fill needle of the present invention;

FIG. 8 is similar to FIG. 3 but is rotated 90° with respect to the valve shown in FIG. 3 and illustrates the mounting of the valve to the manifold.

DESCRIPTION OF THE PREFERRED EMBODIMENT

Figure 1:
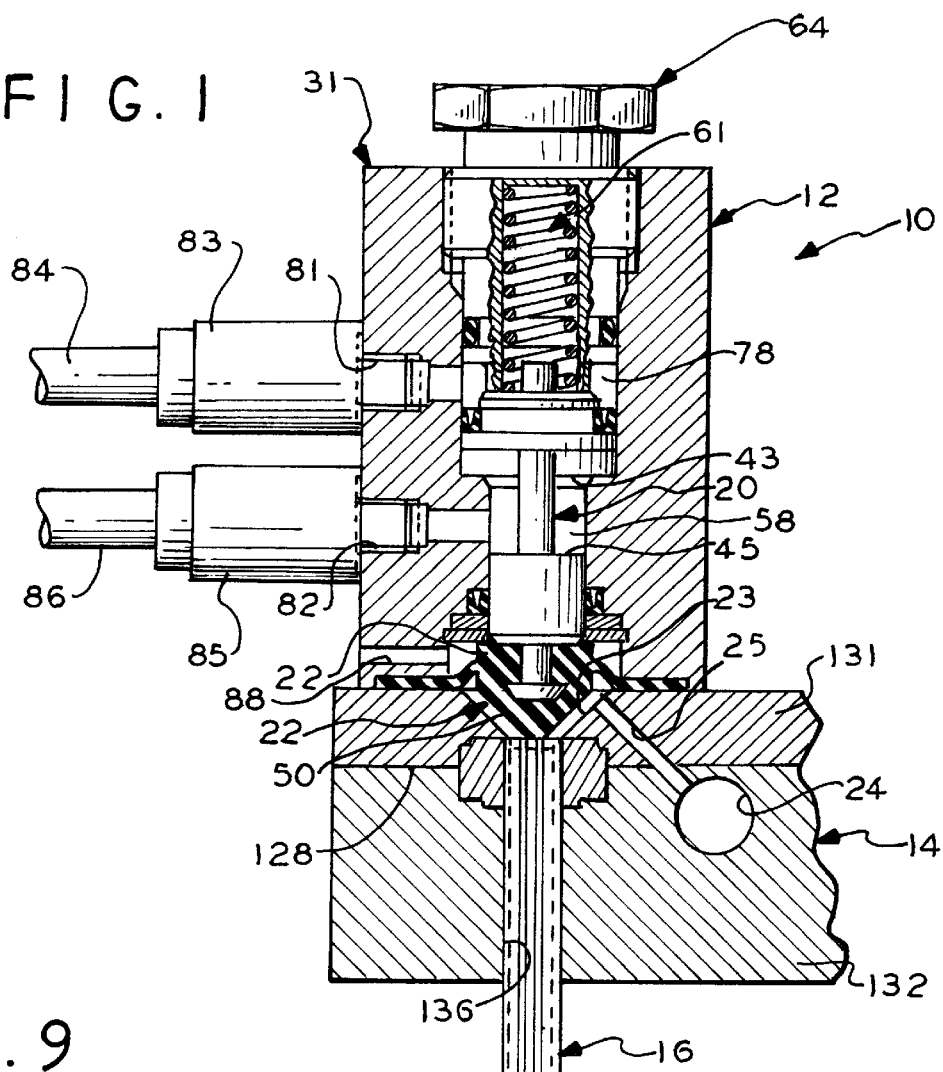
FIG. 1 is a vertical cross-sectional view of apparatus for dispensing liquid embodying the present invention and which shows the included valve in the open position for liquid dispensing.
Figure 2:
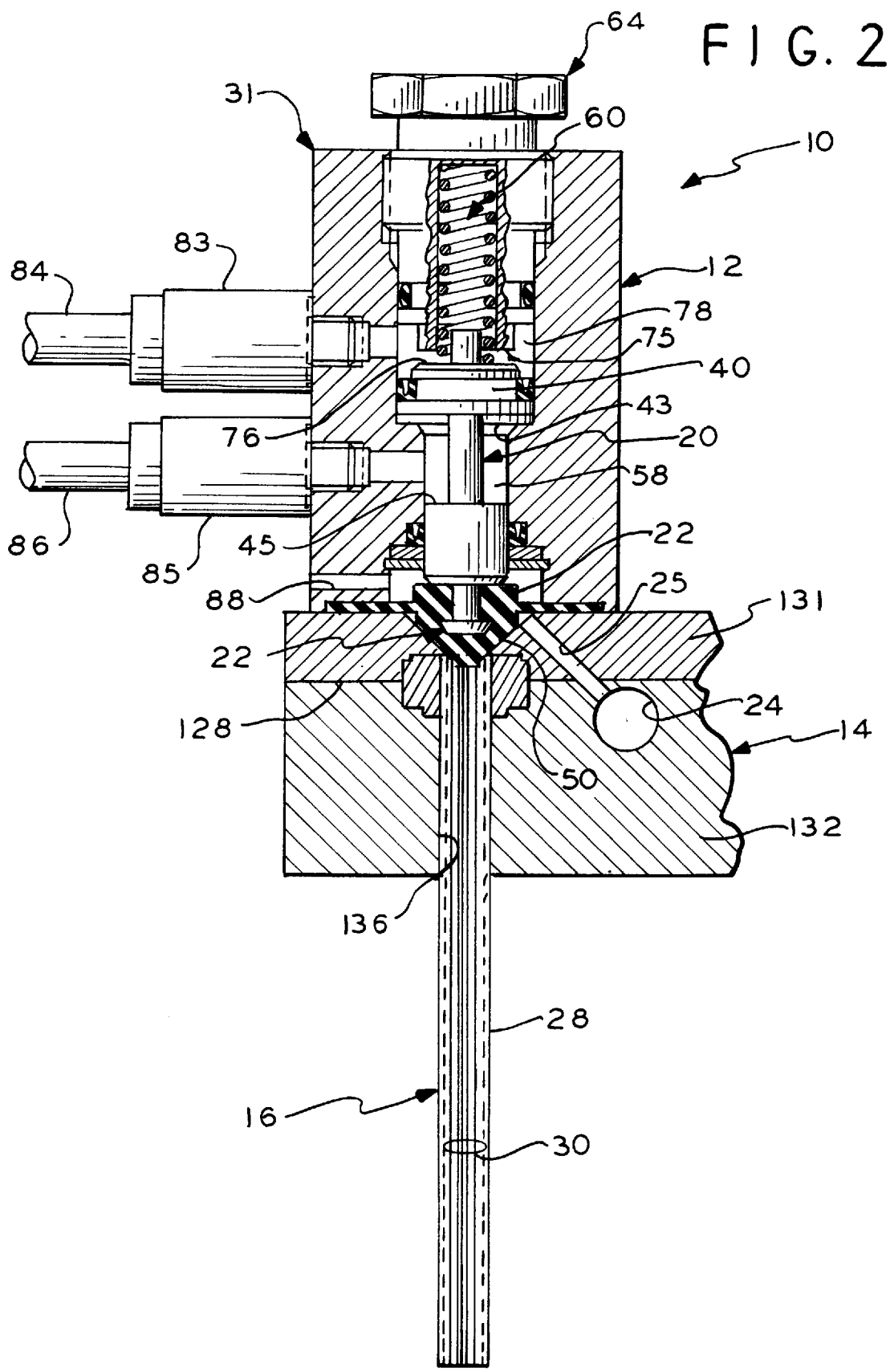
FIG. 2 is a view similar to FIG. 1 but shows the valve in the closed position for cessation of liquid dispensing.

Referring to FIGS. 1 and 2, apparatus for dispensing liquid embodying the present invention is shown and indicated by general numerical designation 10. Apparatus 10 includes a valve indicated by general numerical designation 12, a manifold indicated by general numerical designation 14 and a fill needle indicated by general numerical designation 16. Further, generally, the valve 12, also note FIG. 3, includes a reciprocally mounted plunger indicated by general numerical designation 20 and which plunger is provided with a compressible and resilient diaphragm indicated by general numerical designation 22. The manifold 14, FIGS. 1 and 2, is provided with an inwardly extending cavity or diaphragm seat 23, an inlet 24 and a passageway 25 in fluid communication with the inlet. The inlet 24 is for admitting a single stream or flow of pressurized liquid into the manifold 18 and the passageway 24 is for communicating the single flow of pressurized liquid into the fill needle 16 upon the valve 12 being in the open position shown in FIG. 1. The pressurized liquid admitted into the manifold inlet 24 may be, for example, pressurized sterile water, saline solution, liquid pharmaceutical, and the like. The fill needle 16, also note FIGS. 4 and 5, includes an external, hollow, elongated, cylindrical tube 28 in which a plurality of internal, hollow, elongated, cylindrical tubes indicated by general numerical designation 30 are mounted. From FIG. 5, it will be particularly noted that the diameter of the internal tubes 30 is smaller than the diameter of the external tube 28.

Generally, and referring again to FIG. 1, apparatus 10 operates as follows: upon the valve 12 being in the open position with the plunger 20 and diaphragm 22 being displaced upwardly from the diaphragm seal 23 and the top of the fill needle 16, a single flow of pressurized liquid is admitted into the manifold inlet 24 and is communicated by the passageway 25 to space between the diaphragm seat 23 and the diaphragm 22 and therefrom into the top of the fill needle 16 whereafter the single flow of pressurized liquid is dispensed downwardly through and out the bottom of the plurality of smaller diameter internal tubes 30 (FIG. 5) in a plurality of smaller individual flows of pressurized liquid. The plurality of individual smaller flows of pressurized liquid may be dispensed, for example, into the above-noted partially formed plastic container produced by a blow-fill-seal machine as also noted above. Upon a predetermined amount of pressurized liquid being dispensed by the fill needle 16, in a manner described in detail below, the valve 12, FIG. 2, is operated into the closed position, with the plunger 20 and resilient diaphragm 22 being displaced downwardly and with the resilient diaphragm 22 being forced into sealing engagement with the diaphragm seat 23 and the top of the plurality of internal tubes 30. Such sealing engagement seals or closes the passageway 25 and interrupts or ceases the flow of pressurized liquid into the plurality of internal tubes 30 whereupon any undispensed liquid contained in the plurality of internal tubes 30 will be retained therein due to capillarity caused by the surface tension between any retained liquid and the walls of the plurality of internal tubes 30. It has been found, in accordance with the teachings of the present invention, that for a specific liquid, under constant conditions of pressure, temperature, etc., there is greater surface tension between the internal walls of the plurality of internal tubes 30 than would be present between such liquid and the internal wall of a single tube of larger diameter (not shown) containing the same volume of liquid as contained by the plurality of smaller diameter internal tubes 30. Such increased surface tension causes increased capillarity and therefore upon the tops of the plurality of smaller internal tubes 30 being closed or sealed by the diaphragm 22 as shown in FIG. 2 and described above, retention of liquid (liquid retention) by the plurality of smaller diameter internal tubes 30 is greater than would be the liquid retention of the above-noted single tube of larger diameter were the top of such single tube of larger diameter to be closed or sealed. Such increased liquid retention is particularly useful upon the liquid dispensing apparatus 10 of the present invention being mounted to a machine, such as for example the above-noted blow-fill-seal machine which machine can, as described above, experience vibration sufficient to cause unwanted liquid discharge from the above-noted single tube of larger diameter containing the same volume of retained liquid as the plurality of individual smaller tubes 30.

Figure 3:
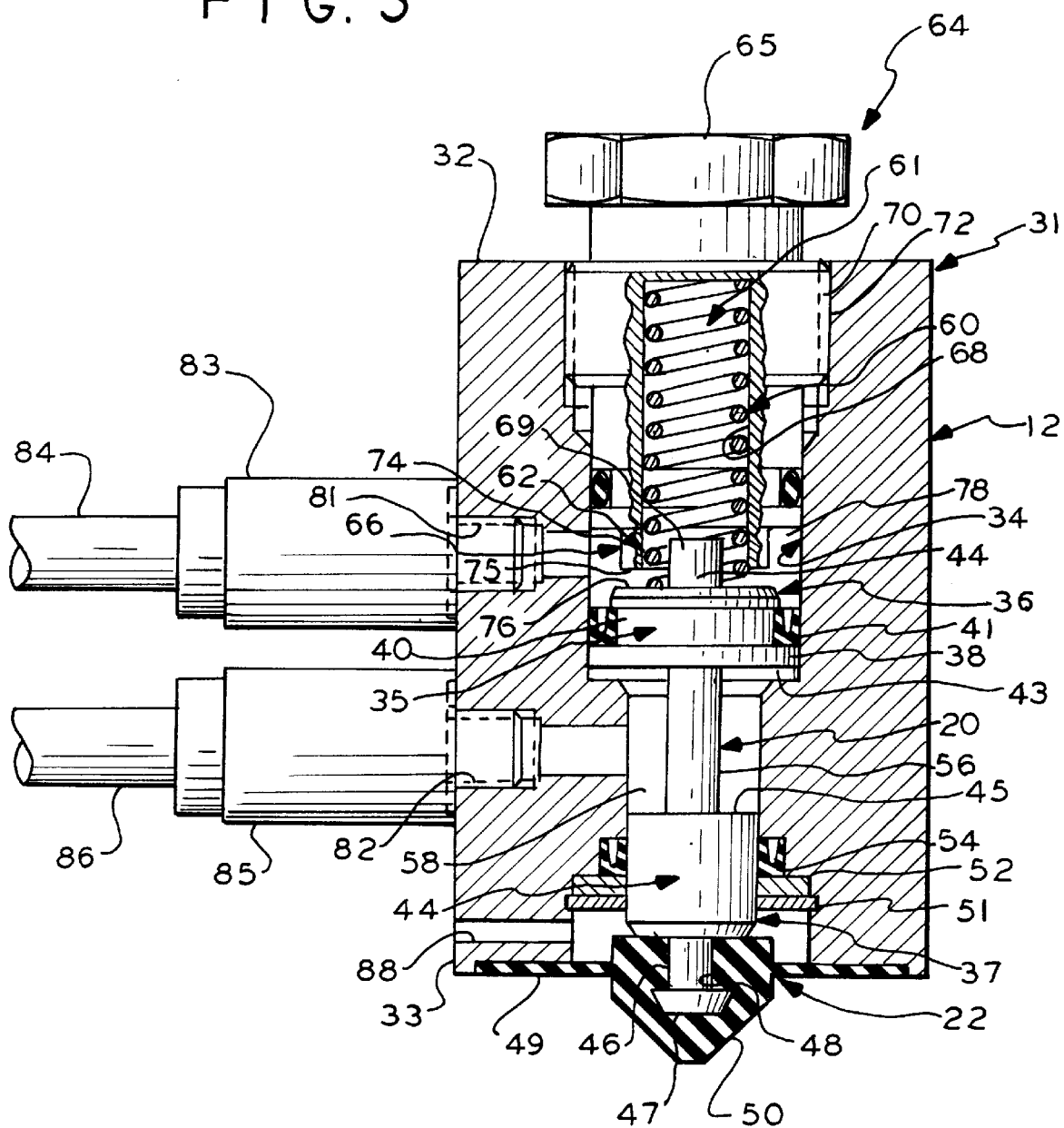
FIG. 3 is an enlarged vertical elevational view, generally in cross-section, of the valve of the present invention.

Reference is now made to FIG. 3 and to the detailed structure of the valve 12. Valve 12 includes a valve body indicated by general numerical designation 31 and having a top end 32 and bottom end 33. A bore, indicated by general numerical designation 34, is formed centrally of the valve body 31 and extends through the valve body 31 from the top end 32 to the bottom end 33; the bore 34 is generally cylindrical but is shaped irregularly as shown in FIG. 3 to accommodate other elements of the invention as described below. The plunger 20 is mounted for sliding reciprocal movement within the bore 34 and for movement toward the top end 32 to open the valve and for movement toward the bottom end 33 to close the valve. The plunger 20 includes a top end indicated by general numerical designation 36 and a bottom end indicated by general numerical designation 37.

Extending radially outwardly from the plunger top end 36 is an upper cylindrical member indicated by general numerical designation 35 and extending radially outwardly from the plunger bottom end 37 is a cylindrical member indicated by general numerical designation 44. Cylindrical member 35 is a compound member and includes a first generally cylindrical and radially outwardly extending portion 38 and a second generally cylindrical and radially outwardly extending portion 40 with the first portion 38 being larger in diameter than the second portion 40. The portions 38 and 40 and an adjacent portion of the internal bore 30 cooperatively provide a valve seat for receiving a generally annular compressible and resilient seal 41 including a generally U-shaped outer peripheral portion. The bottom of the first cylindrical portion 38 provides a pressurized air reaction surface 43 and the top of the second cylindrical portion 40 provides a pressurized air reaction surface 76. As will be noted from FIG. 3, the diameter of the cylindrical member 44 is smaller than the diameter of the first cylindrical portion 38 provided at the plunger top end 36; the top of the cylindrical member 44 provides a pressurized air reaction surface 45 which is smaller than the pressurized air reaction surface 43 provided on the bottom of the first cylindrical portion 38 provided at the plunger top end 36. Extending downwardly from the cylindrical member 44 is a cylindrical member 46 having a diameter smaller than the diameter of the cylindrical member 44, and extending downwardly and radially outwardly from the cylindrical member 46 is a frusto-conical member 47 decreasing in diameter downwardly from the cylindrical member 46; the cylindrical member 46 and frusto-conical member 47 cooperatively provide a mounting member for mounting the diaphragm 22 to the plunger 20. The diaphragm 22 is provided with a cavity 48 complementary in shape to the plunger cylindrical member 46 and frusto-conical member 47 and upon the diaphragm 22 being forced over the members 46 and 47 the cavity 48 receives the members 46 and 47 thereby mounting the diaphragm 22 to the bottom end of the plunger 20. The diaphragm 22 is provided with an integrally formed annular and radially outwardly extending portion 49 which, as will be understood from FIGS. 1 and 2, provides a seal between the valve 12 and the manifold 14. As will be further noted from FIG. 3, the bottom portion of the diaphragm 22 comprises a frusto-conical portion 50.

Surrounding the cylindrical plunger portion 44, FIG. 3, is an annular internal retaining ring 51 and a thrust washer 52. The plunger cylindrical portion 44, thrust washer 52, and a portion of the internal wall defining the bore 34 cooperatively provide a valve seat for receiving an annular seal 54 provided with a generally U-shaped outer peripheral portion.

As is further shown in FIG. 3, the top and bottom plunger cylindrical members 35 and 44 are interconnected by an integrally formed cylindrical member 56 having a diameter smaller than the diameters of the cylindrical plunger portions 35 and 44. The cylindrical member 56, the adjacent portion of the bore 34 and the opposed pressurized air reaction surfaces 43 and 45 provide or comprise a pressurized air receiving chamber 58.

Referring further to FIG. 3, the valve 12 further includes a compression spring indicated by general numerical designation 60 and which includes a top end portion indicated by general numerical designation 61 and a bottom end portion indicated by general numerical designation 62. Further, the valve 12 includes an adjustable member indicated by general numerical designation 64 for varying the vertical up and down movement, i.e. the displacement or stroke, of the plunger 20. The adjustable member 64 includes a hex-headed top end 65 and a bottom end indicated by general numerical designation 66. Extending inwardly into the member 64 from the bottom end portion 62 is a dead-ended bore 68 for receiving the top end portion 61, and substantially all of the compression spring 60 with the spring bottom end portion 62 extending downwardly out of the bore 68. Extending upwardly from the top plunger cylindrical portion 40 is a cylindrical member 69 having a diameter reduced with respect to the plunger cylindrical portion 40; the cylindrical member 69 is for receiving, or for being encircled by, the bottom end portion 62 of the compression spring 60 with the compression spring bottom end portion 62 engaging the pressurized air reaction surface 76. The top end portion 70 of the internal bore 34 is provided with internal threads for receiving external threads provided on the cylindrical portion 72 of the member 64; such internal and external threads are indicated diagrammatically in FIG. 3 by the vertical dashed lines on the cylindrical member 72.

Upon the hex-headed portion 65 of the member 64 being rotated clockwise, as viewed downwardly in FIG. 3, the member 64 is threaded inwardly into the bore 34 to decrease the movement, displacement or stroke, of the plunger 20 in the bore. Upon the hex-headed portion 65 being rotated counterclockwise as viewed downwardly in FIG. 3, the member 64 is threaded outwardly from the bore 34 to increase the movement, displacement or stroke, of the plunger 20 in the bore. The compression spring 60 acts like a cushion member or shock absorber to cushion the stopping of the upward movement of the plunger 20 in the bore 34 and in the event of the loss of pressurized air to the valve 10, for other failure of the valve 10, the compression spring 30 moves the plunger 20 and diaphragm 22 downwardly into the sealing position to cause the valve 10 of the present invention to fail in the closed position.

The bottom end portion 66 of the adjustable member 64, FIG. 3, includes an annular portion 74 providing a pressurized air reaction surface 75. The upper plunger cylindrical portion 40, as noted above, is provided with a pressurized air reaction surface 76 and the pressurized air reaction surfaces 75 and 76 and the adjacent portion of the bore 34 comprise or provide a pressurized air receiving chamber 78.

The left side of the valve body 31, FIG. 3, is provided with a first port 81 in fluid communication with the pressurized air receiving chamber 78, and a second port 82 in fluid communication with the pressurized air receiving chamber 58. Suitably mounted to the first port 81 is a connector 83 which is connected to a tube or hose 84 and suitably mounted to the port 82 is a connector 85 which is connected to a tube or hose 86. The port 81, connector 83 and tube or hose 84 are for admitting pressurized air into, and for exhausting pressurized air from the pressurized air receiving chamber 78. Similarly, the port 82, connector 85 and tube or hose 86 are for admitting pressurized air into, and for exhausting pressurized air from, the pressurized air receiving chamber 58. Further, the lower left portion of the valve body 31 is provided with a bore 88 for providing an indication if there is a liquid leak between the manifold 14 and the diaphragm 22.

Referring now to FIG. 8, and to the mounting of the valve 12 to the manifold 14, FIGS. 1 and 2, the valve body 31 is provided with a pair of bores 90 and 92 extending therethrough from the top valve body end 32 to the bottom valve body end 33 and which bores are for respectively receiving headed mounting rods 93 and 94 having respective threaded lower ends 95 and 96 for being threaded into threaded bores (not shown) provided in the manifold 14 (FIGS. 1 and 2) to mount the valve 12 to the manifold 14.

Referring now to the detailed structure of the fill needle 16, reference is made to FIGS. 4–7. In addition to the above-described external tube 28 and plurality of internal tubes 30, the fill needle 16 includes a bushing 101, FIGS. 4 and 6, and a pair of sleeves 103 and 104, FIG. 4, with representative sleeve 103 being shown in FIG. 7. The outer tube 28, FIG. 4, includes an upper portion indicated by general numerical designation 105 and a lower portion indicated by general numerical designation 106. The bushing 101 is shown in detail in FIG. 6 and includes an internal bore 108 complementary in shape to the exterior of the external tube 28 (FIG. 4) and is for surrounding and being suitably mounted to the upper portion 105 of the external tube 28 as shown in FIG. 4. The sleeves 103 and 104, and referring to representative sleeve 103 of FIG. 7, are provided with a plurality of bores 108 extending therethrough complementary in shape to, equal in number to, and for receiving the plurality of internal tubes 30. The plurality of internal tubes 30 include an upper portion, FIG. 4, indicated by general numerical designation 109 and a lower portion indicated by general numerical designation 110. The sleeve 103, receives the upper portion 103 of the plurality of internal tubes 30 as shown in FIG. 4 and is suitably mounted thereto; similarly, the sleeve 104 shown in FIG. 4 also receives the lower portion 110 of the plurality of internal tubes 30 and is suitably mounted thereto as shown in FIG. 4.

The arrangement or disposition of the plurality of internal tubes 30 in the external tube 28 is best seen in FIG. 5. From FIG. 5 it will be noted that the plurality of internal tubes 30 includes a central tube 112 surrounded by a first circular array of internal tubes indicated diagrammatically by the spaced arcuate lines 113–116 and by a second circular array of internal tubes indicated by the spaced arcuate lines 118–126. It will be noted from FIG. 5 that the circular arrays of internal tubes are disposed concentrically with respect to each other and with respect to the central internal tube 112.

As will be noted from FIG. 4, the top portion 103 of the plurality of internal tubes 30 is provided with inwardly extending frusto-conical indentation indicated by general numerical designation 128; indentation 128 is generally complementary in size and shape to, and for being sealingly engaged by the lower portion of the frusto-conical portion 50 (FIG. 3) of the diaphragm 22.

Figure 9:
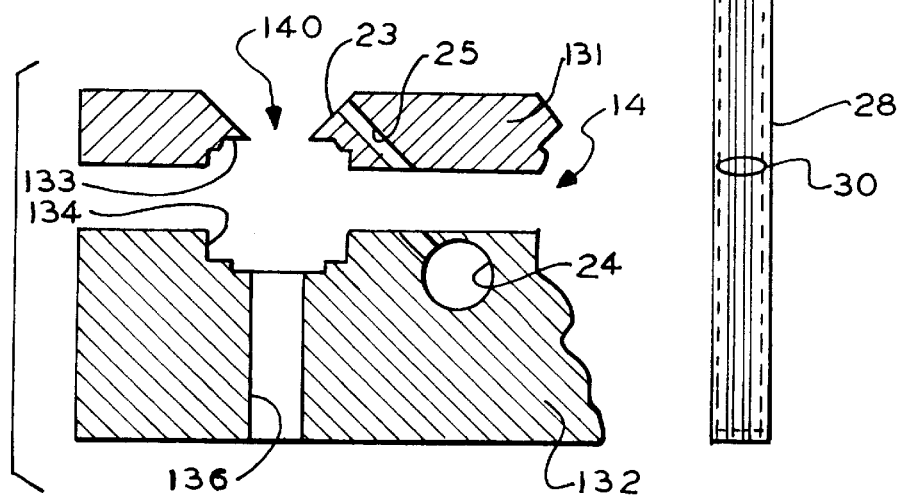
FIG. 9 is an exploded, partial vertical elevational view of the manifold included in the apparatus for dispensing liquid of the present invention.

Referring again to the manifold 14, and to FIGS. 1, 2 and 9, the manifold 14 is a split manifold, split generally along the line 128 (FIGS. 1 and 2) to permit mounting of the fill needle 16 to the manifold. The manifold 14, as best seen in FIG. 9, includes an upper manifold portion 131 and a lower manifold portion 132. The upper manifold portion 131 is provided with a cavity 133 and the lower manifold portion 132 is provided with a cavity 134. Cavities 133 and 134 are disposed oppositely and, upon the manifold upper and lower portions being suitably mounted together, cooperatively provide a cavity complementary in shape and size to and for receiving the bushing 101 of the fill needle 16 as shown in FIGS. 1 and 2. As will be further noted from FIG. 9, the lower manifold portion 132 is provided with a bore 136 extending therethrough and being complementary in shape and size to and for receiving the upper portion of the external tube 28 as shown in FIGS. 1 and 2. As will be best understood from FIG. 1, upon the valve 12 being mounted to the manifold 14 as described above, the diaphragm seat 23 is opposite the frusto-conical portion 50 of the diaphragm 22. The diaphragm seat 23, as best shown in FIGS. 1 and 9, is an inwardly extending conical diaphragm seat and is provided with an open bottom or hole indicated in FIG. 9 by general numerical designation 140; the conical diaphragm seat 23 is complementary in size and shape to the conical portion of the frusto-conical portion 50 of the diaphragm 22. The opening or hole 140 provides access for the lower portion of the diaphragm frusto-conical portion 50, FIG. 1, to the tops of the plurality of internal tubes 30 and to permit the lower portion of the diaphragm frusto-conical portion 50 to enter the frusto-conical indentation 128 (FIG. 4) to sealingly engage the tops 103 of the plurality of internal tubes 30.

Referring now to the detailed operation of the apparatus 10 of the present invention for dispensing pressurized liquid, and referring again to FIGS. 1 and 2 and first to FIG. 2, under normal conditions, with no pressurized air being admitted into the pressurized air receiving chambers 78 and 50, the compression spring 60 normally biases the plunger 20 downwardly and forces the frusto-conical diaphragm portion 50 into sealing engagement with the manifold diaphragm seat 23 to close the liquid passageway 25 and into sealing engagement with the tops of the plurality of internal tubes 30 to prevent pressurized liquid entering the liquid inlet 24 from flowing into the plurality of internal tubes 30 through the passageway 25. Referring then to FIG. 1, upon suitable pressurized air being admitted into the pressurized air receiving chamber 58 through the tube or hose 86, connector 85, and port 82, the pressurized air acts against both the opposed pressurized air reaction surfaces 43 and 45 and, since the pressurized air reaction surface 43 as described above is greater than the pressurized air reaction surface 45, the plunger is moved upwardly to the open position shown in FIG. 1 against the force of the compression spring 61 to open the valve whereupon pressurized liquid flows into the inlet 24, through the passageway 25, into the space between the diaphragm frusto-conical portion 50 and the diaphragm seat 23 and therefrom into the tops of the plurality of the internal tubes 30 and downwardly therethrough for dispensing in a plurality of smaller flows of pressurized liquid into, for example, the above-noted partially formed plastic container; when pressurized air is being admitted into the pressurized air receiving chamber 58, the pressurized air receiving chamber 78 is exhausted, through the port 81, connector 83 and tube or hose 84. Upon a predetermined amount of liquid being dispensed in the manner well known to the art, the flow of pressurized air into the pressurized air reaction chamber 58 is stopped and the chamber 58 is suitably exhausted through the port 82, the connector 85, and the tube or hose 86. Pressurized air is then suitably admitted into the pressurized air receiving chamber 78 through the tube or hose 84, connector 83 and port 82 to react against the pressurized air reaction surface 75 provided on the adjustable member 64, which reaction surface 75 is stationary upon the adjustable member 64 being positioned within the bore 34, and against the pressurized air reaction surface 76 provided on the top portion 40 of the plunger 20 to force the plunger downwardly, with the assistance of the compression spring 60, causing the diaphragm frusto-conical portion 50 to enter and sealingly engage the conical manifold diaphragm seat 23 (FIG. 9) thereby closing the liquid passageway 25 and to enter, through the hole 140 (FIG. 9) provided at the bottom of the diaphragm seat 23, the frusto-conical indentation 108 (FIG. 4) provided in the top portion 103 (FIG. 4) of the plurality of internal tubes 30 to thereby sealingly engage the tops of the internal tubes 30, as shown in FIG. 2, whereby the dispensing of the pressurized liquid downwardly through the plurality of internal tubes 30 is interrupted or stopped. As noted generally above, upon the diaphragm frusto-conical portion 50 sealingly engaging the tops 103 of the plurality of internal tubes 30 any undispensed liquid contained in the plurality of internal tubes 30 will be retained therein by capillarity caused by surface tension between any such retained liquid and the internal walls of the plurality of internal tubes 30.

In a preferred embodiment of the present invention, the valve body 31, the plunger 20, and the variable member 64 were each made of a suitable stainless steel. Similarly, the manifold portions 131 and 132 were made of a suitable stainless steel as were the bushing 101, sleeves 103 and 104, external tubes 28 and internal tubes 30. The bushing 101 was brazed to the upper exterior portion of the external tube 28 and the top and bottom portions of the plurality of internal tubes 30 were brazed respectively to the sleeves 103 and 104; the sleeves 103 and 104 were brazed to the interior of the external tube 28. Upon the fill needle 16 being mounted to the manifold halves 131 and 132, the fill needle and manifold halves were mounted together by suitable means such as bolts (not shown). The compressible and resilient diaphragm was made of silicone and the seals 38 and 52 were made of TEFLON available from DuPont. The thrust washer 52 and the retaining ring 51 were made of stainless steel. The external tube 28 of the fill needle had an O.D. of about 0.625 inch and an I.D. of about 0.555 inch. Each tube of the plurality of internal tubes had an O.D. of about 0.063 inch and an I.D. of about 0.048 inch; the ratio of the I.D. of the external tube 28 to the I.D. of each of the internal tubes 30 is about 11 to 1.

It will be understood that many variations and modifications may be made in the present invention without departing from the spirit and the scope thereof.

What is claimed is:

1. Apparatus for dispensing pressurized liquid, comprising:
    valve means having an open position and a closed position;
    fill needle means including an external tube and a plurality of internal tubes smaller in diameter than the diameter of said external tube and mounted internally of said external tube, upon the liquid being communicated to said fill needle said liquid being dispersed through said plurality of internal tubes; and
    manifold means for receiving and communicating said liquid to said fill needle means upon said valve being in said open position, and the communication of the liquid to said fill needle means by said manifold means being stopped by said valve means upon said valve means being in said closed position.

2. The apparatus according to claim 1 wherein said valve means are mounted to said manifold means and wherein said fill needle means are mounted to said manifold means opposite said valve means.

3. The apparatus according to claim 2 wherein said valve means include a reciprocally mounted plunger mounted for sliding movement away from said manifold means to provide said valve means open position and mounted for sliding movement towards said manifold means to provide said valve means closed position.

4. The apparatus according to claim 3 wherein said valve means include a valve body mounted to said manifold means, wherein said valve means is provided with a generally centrally formed bore extending therethrough and wherein said plunger is mounted slidably in said bore.

5. The apparatus according to claim 4 wherein said plunger includes a plunger top and a plunger bottom opposite said plunger top, said plunger bottom disposed adjacent said manifold means and said plunger bottom provided with a resilient diaphragm for engaging said manifold means to stop the communication of the liquid from said manifold means to said fill needle means.

6. The apparatus according to claim 5 wherein said plunger bottom is provided with a diaphragm mounting member including a downwardly extending cylindrical member and a frusto-conical member extending downwardly from said cylindrical member and decreasing in diameter downwardly from said cylindrical member, and wherein said diaphragm is provided with an inwardly extending cavity complementary in shape to and for receiving said diaphragm mounting member to mount said diaphragm to said plunger.

7. The apparatus according to claim 5 wherein said diaphragm includes a frusto-conical portion extending downwardly from said plunger bottom and wherein said frusto-conical portion decreases in diameter downwardly from said plunger bottom.

8. The apparatus according to claim 7 wherein said diaphragm further includes an integrally formed annular portion surrounding and extending radially outwardly from said frusto-conical portion and providing a seal between said valve means and said manifold means.

9. The apparatus according to claim 7 wherein said bottom end of said plunger includes a radially outwardly extending cylindrical bottom member and an opposed radially outwardly extending cylindrical top member and an intermediate cylindrical member intermediate and interconnecting said cylindrical bottom member and said cylindrical top member, said cylindrical bottom member and said cylindrical top member having diameters and wherein the diameter of said intermediate cylindrical member is smaller than the diameters of said plunger cylindrical bottom member and said plunger cylindrical top member.

10. The apparatus according to claim 9 wherein said plunger cylindrical bottom member includes a top surface which provides a first pressurized air reaction surface and wherein said plunger top cylindrical member includes a bottom surface which provides a second pressurized air reaction surface, wherein said first pressurized air reaction surface and said second pressurized air reaction surface are opposed and wherein said second pressurized air reaction surface is larger than said second pressurized air reaction surface, wherein said first pressurized air reaction surface and second pressurized air reaction surface and said intermediate cylindrical member and an adjacent first portion of said bore comprise a first pressurized air receiving chamber for receiving pressurized air, and wherein said plunger cylindrical top member includes a top surface which provides a third pressurized air reaction surface.

11. The apparatus according to claim 10 wherein said bore includes a top portion and wherein said valve means further includes an adjustable member and a compression spring, said adjustable member mounted threadedly internally in said top portion of said bore for threaded movement downwardly into said bore and for threaded movement upwardly in said bore, said adjustable member including opposed top and bottom portions and wherein said variable member is provided with a dead-ended bore extending upwardly from said bottom portion toward said top portion, wherein said plunger cylindrical top member includes a cylindrical spring mounting member extending upwardly from said third reaction surface wherein said compression spring includes a top portion residing in said dead-ended bore and a bottom portion extending downwardly out of said dead-ended bore and surrounding said cylindrical spring mounting member and engaging said third pressurized air reaction surface to normally force said plunger downwardly into said bore to normally cause said diaphragm to engage said manifold means to normally place said valve means in said closed position.

12. The apparatus according to claim 11 wherein said bottom portion of said adjustable member includes a bottom surface which provides a fourth pressurized air reaction surface, wherein said third pressurized air reaction surface and said fourth pressurized air reaction surface and an adjacent second portion of said bore comprise a second pressurized air receiving chamber for receiving pressurized air, wherein upon said second pressurized air receiving chamber being exhausted and upon first pressurized air being admitted into said first pressurized air receiving chamber said first pressurized air reacting against such first pressurized air reaction surface and said second pressurized air reaction surface and due to said second pressurized air reaction surface being larger than said first pressurized air reaction surface said first pressurized air moving said plunger away from said manifold means against the action of said compression spring to provide said open portion of said valve means, and wherein upon said first pressurized air receiving chamber being exhausted and upon second pressurized air being admitted into said second pressurized air receiving chamber said second pressurized air reacting against said third pressurized air reaction surface and said fourth pressurized air reaction surface to move said plunger downwardly, with the assistance of said compression spring, away from said manifold means to provide said closed position of said valve means.

13. The apparatus according to claim 12 wherein said valve body is provided with first inlet means in fluid communication with said first pressurized air receiving chamber and for admitting pressurized air into and for exhausting pressurized air from said first pressurized air receiving chamber, and wherein said valve body is provided with said second inlet means in fluid communication with said second pressurized air receiving chamber and for admitting pressurized air into and for exhausting pressurized air from said second pressurized air receiving chamber.

14. The apparatus according to claim 11 wherein upon said adjustable member being threaded inwardly the sliding movement of said plunger in said bore is decreased and wherein whereupon said adjustable member being threaded upwardly in said bore the sliding movement of said plunger in said bore is increased.

15. The apparatus according to claim 14 wherein said valve body is provided with a second bore extending from the exterior of said valve body to said diaphragm and wherein said second bore is for providing an indication of any leak of liquid between said manifold means and said valve means.

16. The apparatus according to claim 1 wherein said fill needle means includes a bushing and a first sleeve and a second sleeve, wherein said external tube includes an upper portion and a lower portion and wherein said internal tubes include upper portions and lower portions, wherein said bushing surrounds and is mounted to said upper portion of said external tube and wherein said bushing is mounted to said manifold means, wherein said first sleeve and said second sleeve are each provided with a plurality of holes extending therethrough and equal in number to said plurality of internal tubes, wherein said upper portions of said internal tubes extend through said holes formed in said first sleeve and are mounted to said first sleeve and wherein said first sleeve is mounted to the interior of said upper portion of said external tube, and wherein said lower portions of internal tubes extend through said holes formed in said second bushing and are mounted to said second bushing and wherein said second bushing is mounted to the interior of said lower portion of said external tube, wherein said upper portion of said plurality of internal tubes is provided with an inwardly extending frusto-conical indentation.

17. The apparatus according to claim 16 wherein said plurality of internal tubes include a central internal tube surrounded by at least one circular array of internal tubes.

18. The apparatus according to claim 16 wherein said central internal tube is surrounded by a plurality of concentrically disposed arrays of internal tubes.

19. The apparatus according to claim 5 wherein said manifold is provided with an inwardly extending diaphragm seat opposite said diaphragm and wherein said diaphragm seat includes a bottom having a hole extending therethrough, wherein fill needle means includes a top portion mounted in said manifold means opposite said hole, wherein said manifold means is provided with a liquid inlet for admitting the liquid into said manifold means and with a passageway extending between said inlet and said diaphragm seat and for communicating the liquid to the diaphragm seat.

20. The apparatus according to claim 16 wherein said manifold is provided with a cavity for receiving said bushing, wherein said external tube of said fill needle means includes an upper portion and wherein said manifold is provided with a bore extending downwardly from said cavity for receiving said upper portion of said external tubes.

21. The apparatus according to claim 2 wherein said valve means is provided with a plunger mounted for movement towards and away from said manifold means, said plunger provided with a resilient frusto-conical diaphragm, said manifold provided with an inwardly extending conical diaphragm seat opposite said diaphragm and a pressurized liquid inlet and a liquid passageway interconnecting said inlet and said diaphragm seat, wherein said diaphragm seat has a bottom provided with a hole, wherein said fill needle means includes a top portion mounted to said manifold means opposite said hole and wherein said plurality of internal tubes have internal walls and include tops provided with an inwardly extending frusto-conical indentation opposite said hole, wherein said valve means include means for moving said plunger away from said manifold means to permit pressurized liquid to enter said inlet and flow through said passageway into said valve seat and enter and flow downwardly through said plurality of internal tubes, and said valve means provided with means for moving said plunger towards said manifold means to cause said diaphragm to enter and sealingly engage said diaphragm seat to close said passageway and interrupt the flow of pressurized liquid to said valve seat and to cause said diaphragm to enter, sealingly engage and close the tops of said plurality of internal tubes and to cause any liquid remaining in said plurality of internal tubes after said tops are closed to be retained in said plurality of internal tubes due to capillarity caused by surface tension between any liquid remaining in said plurality of internal tubes and the internal walls of said plurality of internal tubes.

22. The apparatus according to claim 21 wherein said frusto-conical diaphragm, said conical diaphragm seat, and said frusto-conical indentation are generally complementary in shape.

23. The apparatus according to claim 1 wherein said external tube has a first I.D., wherein each tube of said plurality of internal tubes has a second I.D. and wherein the ratio of said first I.D. to said second I.D. is about 11 to 1.

* * * * *

UNITED STATES PATENT AND TRADEMARK OFFICE
CERTIFICATE OF CORRECTION

PATENT NO. : 5,887,768
DATED : 3/30/99
INVENTOR(S) : Jeffrey L. Price and Richard Q. Poynter It is certified that error appears in the above-indentified patent and that said Letters Patent is hereby corrected as shown below:

On the title page, insert the following:
--[73] Vital Signs, Inc., Totowa, N.J.--

Signed and Sealed this

Twenty-sixth Day of October, 1999

*Attest:*

Q. TODD DICKINSON

*Attesting Officer*  *Acting Commissioner of Patents and Trademarks*